United States Patent
Fok et al.

(10) Patent No.: US 9,137,664 B2
(45) Date of Patent: Sep. 15, 2015

(54) APPLICATION LOGGING INTERFACE FOR A MOBILE DEVICE

(75) Inventors: Kenny Fok, San Diego, CA (US); Eric Chi Chung Yip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1393 days.

(21) Appl. No.: 11/962,041

(22) Filed: Dec. 20, 2007

(65) Prior Publication Data
US 2008/0274716 A1  Nov. 6, 2008

Related U.S. Application Data

(60) Provisional application No. 60/915,120, filed on May 1, 2007.

(51) Int. Cl.
 *H04W 12/08* (2009.01)
 *H04L 12/26* (2006.01)
 *H04L 29/06* (2006.01)

(52) U.S. Cl.
 CPC ........... *H04W 12/08* (2013.01); *H04L 43/0817* (2013.01); *H04L 63/0823* (2013.01); *H04L 63/145* (2013.01)

(58) Field of Classification Search
 USPC .......... 445/410, 411, 423–425; 713/156–158, 713/175–177; 380/270–273; 455/410, 411, 455/423–425; 370/328, 252, 253
 See application file for complete search history.

(56) References Cited

U.S. PATENT DOCUMENTS

| | | | |
|---|---|---|---|
| 6,138,235 A | 10/2000 | Lipkin et al. | |
| 6,813,269 B1 * | 11/2004 | Clougherty et al. | 370/392 |
| 7,283,816 B2 | 10/2007 | Fok et al. | |
| 7,623,846 B2 | 11/2009 | Hybre et al. | |

(Continued)

FOREIGN PATENT DOCUMENTS

| | | |
|---|---|---|
| JP | 2003060766 A | 2/2003 |
| JP | 3108560 U | 4/2005 |

(Continued)

OTHER PUBLICATIONS

Taiwan Search Report—TW097116134—TIPO—Feb. 2, 2012.
(Continued)

*Primary Examiner* — Thai Nguyen
(74) *Attorney, Agent, or Firm* — Ramin Mobarhan

(57) ABSTRACT

A mobile device, and particularly a wireless device, provides a computing platform upon which third-party (e.g., accessory) applications can execute, increasing features/functions desirable to a user. In order to better serve users of wireless devices, third-party developers of such applications would benefit from information about how their fielded applications are being used. However, creating log packets that can ultimately reach the developers is generally not permissible or enabled by wireless devices due to privacy concerns, safeguards against malicious applications, the environment generally afforded to accessory applications, the limited communication channel (e.g., bandwidth, duration, user expense, etc.), and difficulty in integrating such applications to chipsets tailored for mobile devices, such as cell phones. Authentication of the application and a defined log header prior to deployment coupled a confirming unlock feature on the device allows for log packets of increasing complexity that can be selectively allowed, filtered, and reported by a device.

28 Claims, 8 Drawing Sheets

(56) References Cited

U.S. PATENT DOCUMENTS

| | | | |
|---|---|---|---|
| 7,703,138 B2 * | 4/2010 | Desai et al. | 726/23 |
| 2002/0138735 A1 * | 9/2002 | Felt et al. | 713/176 |
| 2002/0194501 A1 * | 12/2002 | Wenocur et al. | 713/201 |
| 2003/0032408 A1 | 2/2003 | Jennings | |
| 2004/0087303 A1 * | 5/2004 | Pugliese | 455/423 |
| 2006/0101408 A1 | 5/2006 | Kotamarthi et al. | |
| 2006/0150248 A1 | 7/2006 | Ross et al. | |
| 2006/0198359 A1 | 9/2006 | Fok et al. | |
| 2007/0147262 A1 * | 6/2007 | Aaron et al. | 370/250 |
| 2009/0070458 A1 | 3/2009 | Fuse et al. | |

FOREIGN PATENT DOCUMENTS

| | | |
|---|---|---|
| JP | 2006319828 A | 11/2006 |
| WO | WO9945454 A1 | 9/1999 |
| WO | WO 2004004381 A1 * | 1/2004 |
| WO | WO 2006043143 A2 * | 4/2006 |
| WO | WO-2006112381 A1 | 10/2006 |
| WO | WO2006128080 A2 | 11/2006 |

OTHER PUBLICATIONS

International Search Report and Written Opinion—PCT/US2008/062098, International Search Authority—European Patent Office—Nov. 12, 2008.

* cited by examiner

APPLICATION LOGGING INTERFACE FOR A MOBILE DEVICE

CLAIM OF PRIORITY UNDER 35 U.S.C. §119

The present Application for Patent claims priority to Provisional Application No. 60/915,120 entitled "Method and Apparatus for Providing an Application Interface for Providing Debug and Usage Pattern Information for a Wireless Communication Device" filed 1 May 2007, and assigned to the assignee hereof and hereby expressly incorporated by reference herein.

BACKGROUND

1. Field

Aspects disclosed herein pertain to a mobile device that selectively collects reports log data, and more particular to wireless communication devices of a communication system that collect and wirelessly report log reports for troubleshooting installed components.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. Consumers are increasingly offered many types of electronic devices that can be provisioned with an array of software applications. Distinct features such as email, Internet browsing, game playing, address book, calendar, media players, electronic book viewing, voice communication, directory services, etc., increasingly are selectable applications that can be loaded on a multi-function device such as a smart phone, portable game console, or hand-held computer.

Even with these advances, mobile communication devices tend to have communication bandwidth, processing, and user interface constraints over general purpose computing devices. For example, the screen size, amount of available memory and file system space, amount of input and output capabilities and processing capability may each be limited by the small size of the device. Because of such severe resource constraints, the computing platforms for such devices are often optimized for a particular telephone chipset and user interface hardware. Applications thus tend to be written in a computer platform independent form, largely functioning in a virtual machine environment with provisions given only for interacting with a user interface.

Security considerations discourage providing additional communication channels to applications residing on a mobile communication device. Allowing applications to access wireless and/or cellular communication channels available to the device can come at the expense of a preferred communication use. In addition, user privacy can be compromised by a suspect application that gains access to a communication channel.

Yet in many situations it would be desirable for both a user and a third-party application developer to allow certain third-party applications to return information packets to a network. For example, a user could be compensated for allowing his usage of the device to monitored and reported, similar to a Nielsen television family. Better applications could be developed and deployed with feedback as to how users interact with them. A user of a game application may wish that his high scores could be advertised beyond merely a stored record on his own wireless device.

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described versions in a simplified form as a prelude to the more detailed description that is presented later.

In one aspect, a method is provided for selectively allowing information packets produced by an accessory application residing on a mobile device having a device monitoring application that sends log information to a destination. Accessory applications deployed for execution on the mobile device are selectively prevented from accessing a diagnostic component. In particular, gating transport of an information packet from the accessory application in performed in response to a determination that the information packet does not violate a defensive constraint to interface with the diagnostic component Thereafter, transfer is performed of an information packet from the accessory application to the device monitoring destination. Thereby, great flexibility in deploying applications to the mobile device is allowed, yet intrusive or malicious applications are prevented from interfering external communication unless the third party application has been authenticated. Utilizing an application interface simplifies expedient deployment and troubleshooting of accessory applications that need not be tailored to a particular chipset or hardware/software operating environment. Otherwise the costs to develop applications suitable for many mobile devices could be prohibitive.

In other aspects, at least one process, a computer program product, and an apparatus comprises means for selectively allowing information packets produced by an accessory application residing on mobile device to reach a device monitoring destination.

In yet a further aspect, a mobile device for selectively allowing information packets produced by an accessory application residing on mobile device to reach a device monitoring destination has at least one trusted component for reporting troubleshooting log packets. A diagnostic component receives a trusted credential from the at least one trusted component and a troubleshooting log packet for sending to a diagnostic monitoring destination. An application interface performs a defensive gating of transport of an information packet from an accessory application. Thereby, the increased functionality is provided to such applications without compromising the integrity and/or functionality of the trusted component. The application interface then can package an information packet from the accessory application with a trusted credential of the application interface to transfer the information packet through the diagnostic component to the diagnostic monitoring destination.

To the accomplishment of the foregoing and related ends, one or more versions comprise the features hereinafter fully described and particularly pointed out in the claims. The following description and the annexed drawings set forth in detail certain illustrative aspects and are indicative of but a few of the various ways in which the principles of the versions may be employed. Other advantages and novel features will become apparent from the following detailed description

DETAILED DESCRIPTION

A mobile device, which in the illustrative version is also a wireless communication device, provides a computing platform upon which third-party (e.g., accessory) applications can execute, increasing features and functions desirable to a user. In order to better serve users of wireless devices, third-party developers of such applications would benefit from information about how their fielded applications are being used. However, creating log packets or reports that can ultimately reach the developers or other entities respondable for troubleshooting the application or providing network enhanced services is generally not permissible or enabled by wireless devices due to privacy concerns, safeguards against malicious applications, the virtual machine operating environment generally afforded to third party applications, the limited communication channel (e.g., bandwidth, duration, user expense, etc.), and difficulty in integrating such applications to chipsets tailored for mobile devices, such as cell phones. Authentication of the application and a defined log header prior to deployment coupled to a confirming unlock feature on the device allows for log packets of increasing complexity that can be selectively allowed, filtered, and reported by a device. By packaging the log packets with a trusted credential (e.g., packet header) of an accessory application interface, accessory applications are able to access a diagnostic channel for troubleshooting without compromising the integrity of the diagnostic system or complicating deployment of such accessory applications.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to concisely describing these versions.

The apparatus and methods are especially well suited for use in wireless environments, but may be suited in any type of network environment, including but not limited to, communication networks, public networks, such as the Internet, private networks, such as virtual private networks (VPN), local area networks, wide area networks, long haul networks, or any other type of data communication network.

Figure 1:
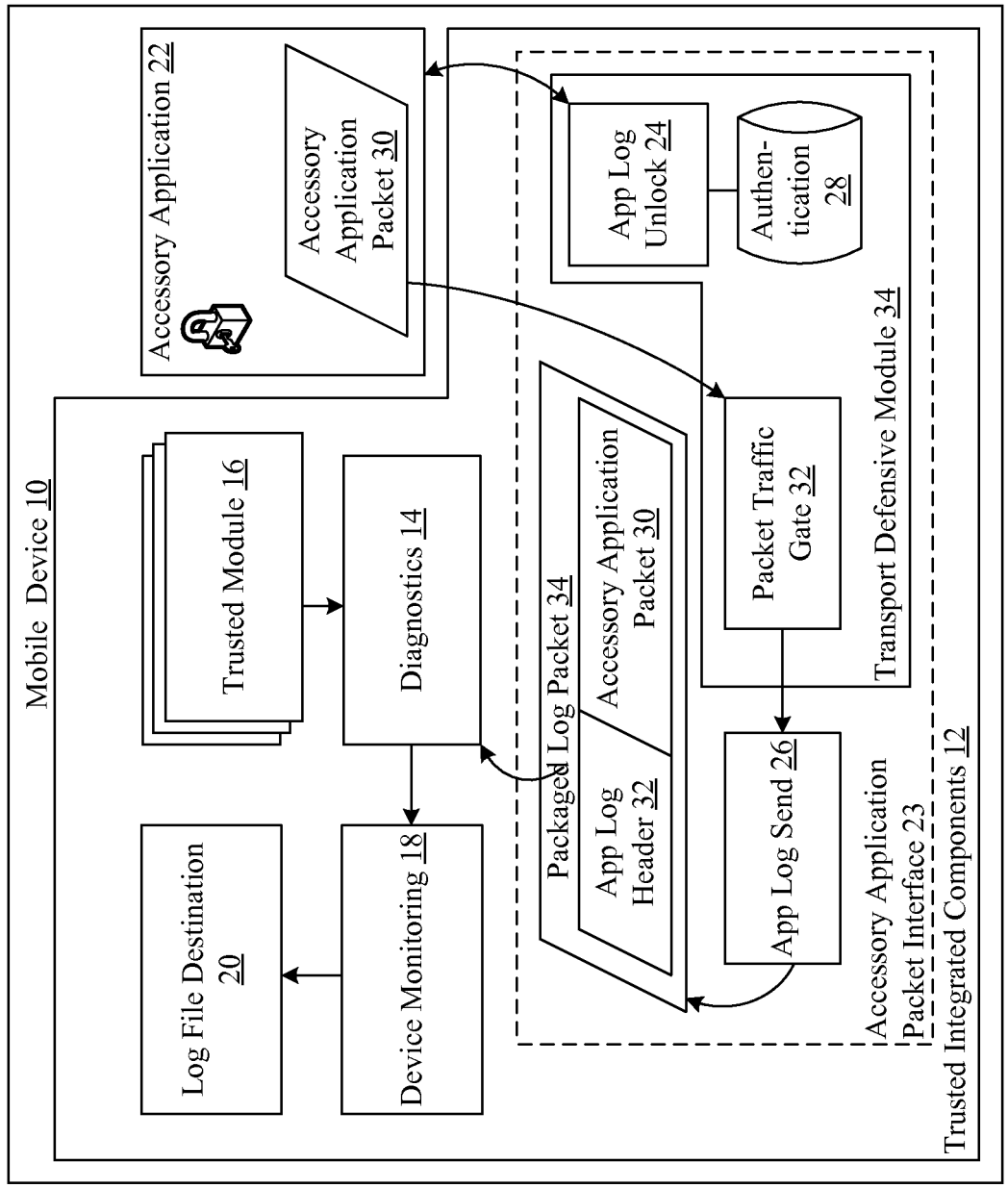
FIG. 1 is a block diagram of a mobile device with interfacing accessory applications to a diagnostic system for log reporting.

Referring to FIG. 1, a mobile device 10 includes a suite of trusted, integrated components 12 serviced by a diagnostic component 14 that enhances device troubleshooting and usage monitoring. Trusted modules 16 are able to access the diagnostics component 14 directly such as for forwarding log packets to a device monitoring component 18 which can store logs at a log file destination 20 (e.g., internal or external consumer of the data, memory storage location, etc.). In some aspects, the destination 20 can be local storage that is externally accessible (e.g., via a user interface or data port) or detachable (e.g., memory card). In other aspects, the log file destination 20 can be remote to the mobile device 10. In an illustrative version the trust, integrated components 12 can comprise an original equipment manufacturer (OEM) configuration that performs a function, such as a communication device, a personal digital assistant, an entertainment player, etc. In order to enhance the available features and configurations to suit certain users, the mobile device 10 can be configured with at least one ancillary or accessory application 22.

In order to avoid the difficulty in executing the at least one application 22 and to avoid compromising the functional integrity of the trusted integrated components 12, the application 22 is limited in its access to certain portions of the mobile device 10, such as the diagnostic component 14. Although perhaps not thoroughly tested sufficiently to trust with increased access, there are reasons for allowing the application 22 to participate in device reporting or diagnostics. Such log reporting functionality can encourage the development and deployment of such applications 22, can enhance the utility of such applications, and/or can minimize user dissatisfaction with performance degradation. To achieve this log capability, an accessory application packet interface 23, which is itself a trusted component with access to the diagnostic component 14, provides simplified access to such applications 22. The accessory application packet interface 23 is depicted as comprising an application log unlock component 24 and an application log send component 26. The mobile device 10 has an authentication database 28 that can confirm a chain of title of a source of the application 22. The application 22 can be authenticated by the application log unlock component 24 that unlocks the application log send component 26 for use by the application 22. When the application has an accessory application log report or packet 30 to send, the application log send component 26 can recognize this authentication and package the accessory application log packet 30 with the trusted credentials of the accessory application packet interface 23, depicted as an application log header 32 to form a packaged log packet 34 that can be accepted by the diagnostic component 14. This packaging allows for flexible formatting of the application log packet 30.

It should be appreciated with the benefit of the present disclosure that the diagnostic component 14 can be dedicated to a diagnostic function to receive, monitor, and/or report diagnostic data. Alternatively, such diagnostic data can be handled as a portion of the functioning of such a component 14.

As an alternative to, or in addition to, the application log unlock component 24, a packet traffic gate 32 also serves a defensive function to safeguard a communication and/or storage capability of the mobile device 10 (e.g., diagnostic component 14. Thus, the mobile device 10 further comprises a transport defensive module 34 that interfaces to an accessory application 22 to facilitate packet transfer yet enhances functional integrity of trusted integrated components 12. Providing the capability for the accessory application 22 to transport information packets (e.g., accessory application packet 30) is done with increased security, either by authentication or by limiting the amount of packet transport allowed. The packet traffic gate 32 can monitor the size of each packet 30, the rate at which each packet 30 is being sent, the total available throughput or storage volume available at the log file destination 20, or portion thereof assigned to the accessory application 22, etc. Such threshold limits can be dynamically determined or remotely set depending upon the monitoring needs of the mobile device 10.

Figure 2:
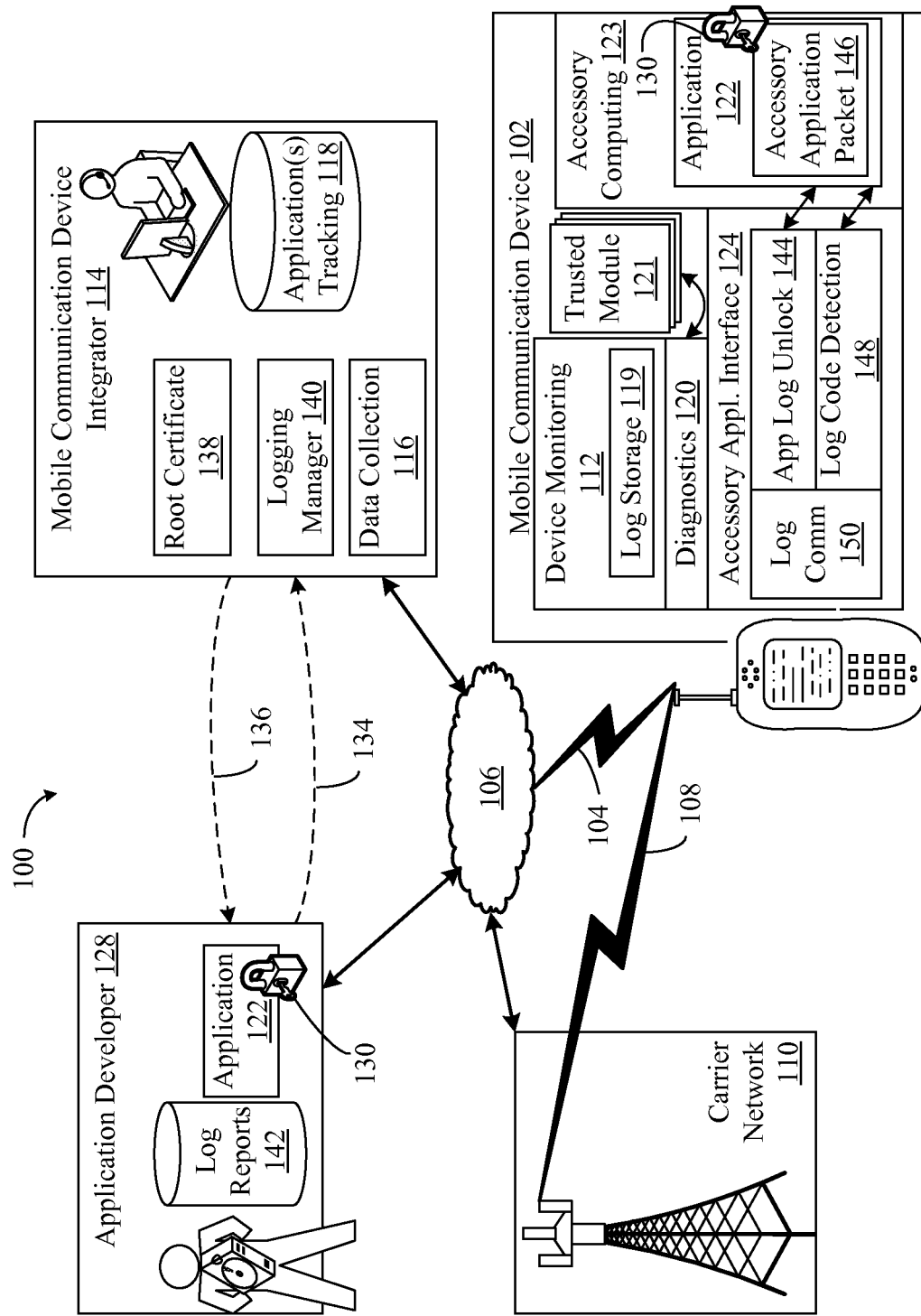
FIG. 2 is a block diagram of a communication system prior authentication of an application that is deployed on a wireless communication device for subsequent wireless reporting back of log packets.

Referring to FIG. 2, a communication system 100 includes a population of wireless devices, depicted as mobile communication devices 102 that communicate with a network, illustrated as a wireless data packet communication channel depicted at 104 with a data network 106 and/or cellular communication channel depicted at 108 with a carrier network 110. At least one mobile communication device 102 includes a device monitoring component 112 that relays device information (e.g., performance parameters, fault-related events, etc.) via one of the communication channels 104, 108 to a mobile communication device integrator 114, who is in communication via the data network 106. Data collection processes 116 stored in an application tracking database 118 by the integrator 114 can be used to improve service for the population of communication device 102 by monitored events detected by a diagnostics component 120 as disclosed in U.S. patent application Ser. No. 11/251,298, entitled Apparatus and methods for determining voice and/or data processing performance of a wireless device, Publication No. 20060198359 A1, assigned to the present assignee and hereby incorporated by reference. Alternatively or in addition, onboard log storage 119 can buffer reports, serve as a resource for later viewing on the device 102 itself, serve as a detachable memory device to reading by another device (not shown), etc.

It should be appreciated that various portions of the communication system 100 can include cable connections rather than wireless links. For example the mobile communication device 102 can include a cable connection for intermittently retrieving stored data packets as an alternative to, or in addition to, wireless communication. As yet another alternative, the communication device 102 can utilize one communication channel, such as an IMS, whereas the log reporting can be sent via short messaging service.

To further the capabilities of the mobile communication device 102, it is frequently desired to add a third-party application 122 (e.g., installed by the original equipment manufacturer (OEM), wirelessly downloaded by the user, etc.). Typically a large variation can exist in the population of mobile communication devices 102 in chipset, hardware, and/or software execution environment for the application 122. Thus, an accessory application interface 124 incorporated into the communication device 102 can provide an execution environment that is substantially platform independent, such as facilitating access by the application 122 with an output device, depicted as a display screen 124, and to an input device, depicted as a keypad 126. Often, however, it is desirable to limit or prevent further interaction by the application 122 with other capabilities of the communication device 102 to prevent inadvertent or malicious interference with device performance or user privacy.

An application developer 128 of the third-party application 122 can seek a digital certificate 130 for a source application 122 that is deployed to the mobile communication device 102 from the integrator 114. By presenting sufficient proof of authentication 134 to satisfy the integrator that the application developer 128 is to be trusted (e.g., proof of identity, certification testing of the source application 122, warranty guarantees, etc.), the integrator provides a leaf certificate 136 based on a retained root certificate 138. The digital certificate 130 is made unique to the source application 122 and subsequent deployed applications 122 by a logging manager component 140 assigning a unique application identifier (ID), such as an application class ID. The digital certificate 130 entitles the application developer 128 to retrieve information packets (e.g., log packets) from deployed applications 122 that are stored for analysis in a log reports database 142.

With this digital certificate 130 deployed to the communication device 102, the application 122 can be authenticated by the accessory application interface 124 via an application log unlock component 144 of the interface 124. When the application 122 has an accessory application packet 146 to send, a log code filter 148 can detect pertinent information about the accessory application packet 146, such as header information that defines a location and size of log file, especially for a binary format of variable length. A log communication component 150 passes the log file through diagnostic component 120 as a transport path to the device monitoring component 112.

It should be appreciated that the depiction of FIG. 2 is illustrative and certain aspects may be configured in various manners. For example, the log reports database 142 can be collected by another entity or entities other than e application developer 128. Similarly, the logging manager component 140 that facilitates the authentication of applications 122 can be performed by various entities and not necessarily by the mobile communication device integrator 114.

Figure 3:
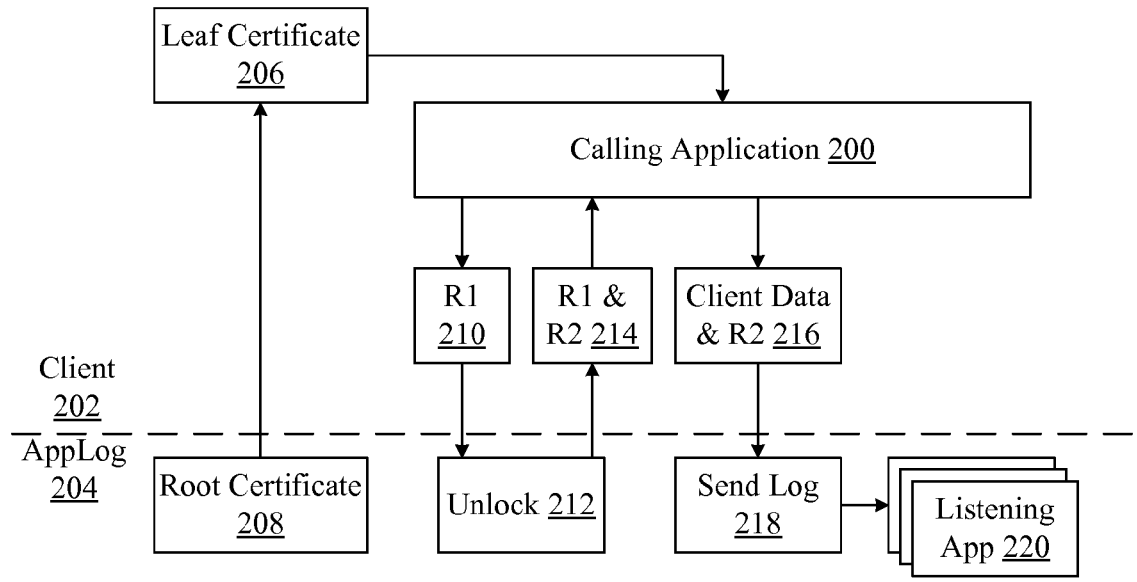
FIG. 3 is a block diagram of an authentication data flow between a client application and an application log manager.

In FIG. 3, in one aspect, a calling application 200 is part of a client component 202 that is configured for reporting client data via an application log component (AppLog) 204. The Applog 204 provides a leaf certificate 206 based upon a retained root certificate 208. The client component 202 incorporates a digital signature encryption capability into the calling application 200. In order to initiate log reporting, the calling application 200 sends a digitally signed random number (R1) 210 to the Applog 204. An unlock component 212 has the public key and recognizes the digital signature of the calling application 200. In response, the unlock component 212 unlocks a communication path for the calling application 200 and replies to the calling application with the random number (R1) and another random number (R2) encrypted with the public key in block 214. The calling application 200 detects the return of the random number (R1) as confirmation that the other party has the public key and can be trusted with log reporting. Thus, the calling application 200 can send a client data report to the AppLog 204 with the second random number (R2) in block 216. Although encryption could continue to be used for enhanced security, the aforementioned authentication provides sufficient confidence in this application 200 along with other security measures regarding other installed components that subsequent messages can be unencrypted for reduced processing overhead. Upon receipt, the AppLog 204 utilizes a Send Log component 218 to forward the client data 216 to listening applications 220 that are registered to receive this information, such as for wirelessly communicating the data to a network 108, 106 (FIG. 2).

Figure 4:
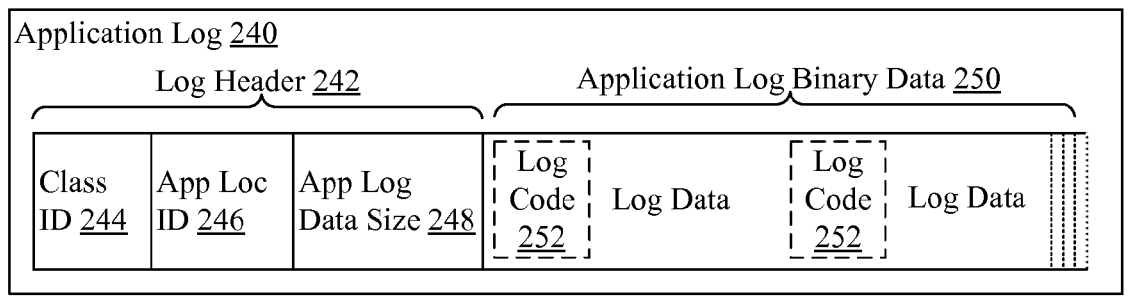
FIG. 4 is a diagram of a data structure for a log packet containing a log header and log data.

In FIGS. 3-4, one aspect includes handling an information packet, depicted as an application log data structure 240 (FIG. 4) wherein a log header 242 format is defined for use by the calling application 200 and AppLog 204 (FIG. 3). A class ID field 244 allows identification of the calling application 200. An application log ID field 246 can assist a network entity that receives the log report in cataloging such reports. An application log data size field 248 enables application log binary data 250 to accompany the log header 242 and for such data 250 to be of variable length, both attributes making better use of available memory storage and providing processing advantages over a requirement for text format log files. In some aspects, the log header 242 can be used to access and to report. In other aspects, the AppLog 204 can be informed of particular log codes 252 of interest that may be present in the log binary data 250. As part of handling such log data structures 240, the AppLog 204 can do a byte-by-byte comparison to identify the presence of any such log codes 252 with reporting filtered in accordance to such codes 252.

Figure 5:
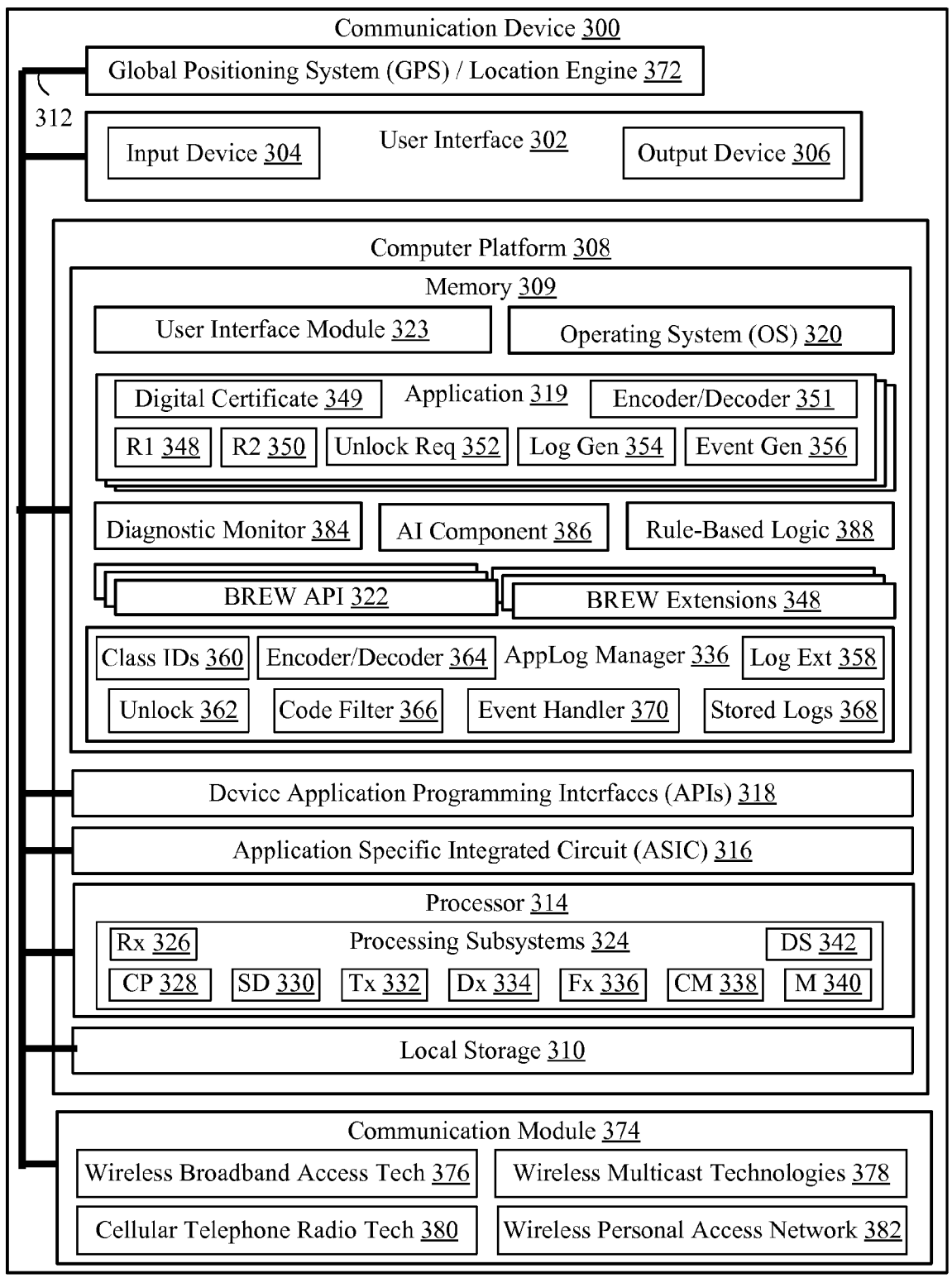
FIG. 5 is a schematic diagram of a communication device of the communication system of FIG. 2.

In FIG. 5, an exemplary version of a communication system 300 is depicted according to some aspects as any type of computerized device. For example, the communication device 300 may comprise a mobile wireless and/or cellular telephone. Alternatively, the communication device 300 may comprises a fixed communication device, such as a Proxy Call/Session Control Function (P-CSCF) server, a network device, a server, a computer workstation, etc. It should be understood that communication device 300 is not limited to such a described or illustrated devices, but may further include a Personal Digital Assistant (PDA), a two-way text pager, a portable computer having a wired or wireless communication portal, and any type of computer platform having a wired and/or wireless communications portal. Further, the communication device 300 can be a remote-slave or other similar device, such as remote sensors, remote servers, diagnostic tools, data relays, and the like, which does not have an end-user thereof, but which simply communicates data across a wireless or wired network. In alternate aspects, the communication device 300 may be a wired communication device, such as a landline telephone, personal computer, set-top box or the like. Additionally, it should be noted that any combination of any number of communication devices 300 of a single type or a plurality of the afore-mentioned types may be utilized in a cellular communication system (not shown). Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the communication device 300 may include a user interface 302 for purposes such as viewing and interacting with advertisements. This user interface 302 includes an input device 304 operable to generate or receive a user input into the communication device 300, and an output device 306 operable to generate and/or present information for consumption by the user of the communication device 300. For example, input device 302 may include at least one device such as a keypad and/or keyboard, a mouse, a touch-screen display, a microphone in association with a voice recognition module, etc. Further, for example, output device 306 may include a display, an audio speaker, a haptic feedback mechanism, etc. Output device 306 may generate a graphical user interface, a sound, a feeling such as a vibration or a Braille text producing surface, etc.

Further, communication device 300 may include a computer platform 308 operable to execute applications to provide functionality to the device 300, and which may further interact with input device 304 and output device 306. Computer platform 308 may include a memory, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory may include active memory and storage memory, including an electronic file system and any secondary and/or tertiary storage device, such as magnetic media, optical media, tape, soft and/or hard disk, and removable memory components. In the illustrative version, memory is depicted as RAM memory 309 and a nonvolatile local storage component 310, both connected to a data bus 312 of the computer platform 308.

Further, computer platform 308 may also include a processor 314, which may be an application-specific integrated circuit (ASIC), or other chipset, processor, logic circuit, or other data processing device. Certain of these capabilities of the communication device 300 can be facilitated by code loaded from local storage 310, retained in memory 309, and executed by the processor 314. In some aspects, such as when communication device 300 comprises a cellular telephone, processor or other logic such as an application specific integration circuit (ASIC) 316 may execute an application programming interface (API) 318 that interfaces with any resident software components, depicted as applications (e.g., games) 319 that may be active in memory 309 for other functions (e.g., communication call control, alarm clock, text messaging, etc.). It should be appreciated with the benefit of the present disclosure that applications consistent with aspects of the present invention may omit other applications and/or omit the ability to receive streaming content such as voice call, data call, and media-related applications in memory 309. Device APIs 318 may be a runtime environment executing on the respective communication device. One such API 318 runtime environment is BREW API 321. The Binary Runtime Environment for Wireless® (BREW®) software, developed by Qualcomm, Inc. of San Diego, Calif., exists over the operating system 320 of a computing device, such as a wireless cellular phone. BREW® software can provide a set of interfaces to particular hardware features found on computing devices. The BREW APIs 322 provide the ability for applications to call Device APIs 318 and other functions without having to be written specifically for the type of communication device 300. Thus, applications 319, if composed in BREW, or other software components on the communication device 300 may operate identically, or with slight modifications, on a number of different types of hardware configurations within the operating environment provided by BREW API 321, which abstracts certain hardware aspects. A BREW extension 322 adds additional capability to the programming platform of the BREW API 321, such as offering MP3 players, Java Virtual Machines, etc.

As an example, a UI module 323 can be a brew extension 322, leveraging a uiOne delivery system (UDS) as part of the network 106 (FIG. 2). The uiOne™ architecture also developed by Qualcomm, Inc. as part of BREW provides a set of BREW extensions 322 that enable rapid development of rich and customizable User Interfaces (UIs) (i.e., active content, over-the-air (OTA) up-gradable), helps to evolve download business beyond applications, provides theming of part or entire handset UI, and utilizes BREW UI Widgets. Thus, BREW uiOne reduces the time to market for handsets, carrier customization, and consumer personalization. To do this, the BREW uiOne provides a clear set of abstractions, adding two new layers to the application development stack for BREW. The uiOne delivery system is used to update communication device UIs over-the-air. This delivery system can be deployed in a standalone fashion, allowing operators to leverage the functionality of their own delivery system. Additional benefits can be realized by deploying uiOne architecture with uiOne delivery system, especially when deployed in conjunction with other elements of the BREW solution (e.g. monetization and billing of downloadable UI packages when the operator does not already have the appropriate infrastructure).

Additionally, processor 314 may include various processing subsystems 324 embodied in hardware, firmware, software, and combinations thereof, that enable the functionality of communication device 300 and the operability of the communication device 300 on communications system 100 (FIG. 2). For example, processing subsystems 324 allow for initiating and maintaining communications, and exchanging data, with other networked devices as well as within and/or among components of communication device 300. In one aspect, such as in a cellular telephone, processor 314 may include one or a combination of processing subsystems 324, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 324 of processor 314 may include any subsystem components that interact with applications executing on computer platform 308.

The illustrative depiction of the processing subsystems 524 wherein the communication device 300 is a cellular telephone, processing subsystems 324 include one or more of a receive ("Rx") component 326 for receiving communications sent to the processor of the wireless device, a call processing ("CP") component 328 and/or system determination ("SD") component 330 for handling the initiation, authentication, handoffs, data exchanges, messaging protocols, internal processing and decision-making, etc. associated with processing a message, and a transmit ("Tx") component 332 for sending communications from the processor of the wireless device, such as to handset components, wireless network 106, wireless network components, and other devices connected to the wireless network. In this version, CP component 328 may handle the majority of the call processing tasks, while SD component 330 may handle tasks relating to selecting an appropriate system, from a plurality of systems, with which to communicate, as well as higher-level decision-making tasks referenced by CP component 328. In addition, processing subsystems 324 may further include one or more of a diagnostic ("Dx") component 334 for evaluating a subsystem, a fax ("Fx") component 336 for handling facsimile communications, a call manager ("CM") 338 component for characterizing and logging call types, a messaging component ("M") 340 for text sending and receiving, and a data services ("DS") component 342 for processing all data-related communications, such as establishing and maintaining data calls.

An Application Log (AppLog) manager (346) serves as an illustrative accessory application interface 124 (FIG. 2) to a log generating application 319, which can perform the authentication steps of FIG. 3 by containing a first random number (R1) data structure 348, a digital signature 349, a second random number (R2) data structure 350, an encoder/decoder 351 for authentication with the AppLog Manager 346, an unlock request component 352, and a log reporting generating component 354. The application 319 can further include an event generator 356 that causes an event to be detected on the computing platform 508 such as for a fault or malfunction state that warrant diagnostic tracking. Such information can enhance the value of log tracking, especially if the fault or malfunction state preclude normal processing of a log report.

The AppLog manager 346 can include a BREW log extension 358 to interface with the application 319, a class ID data structure 360 to serve as a reference for permission levels and identification of applications 319 that call the AppLog Manager 346, an unlock component 362 that responds to the unlock request component 352 of the application 319 after decoding the signal with an encoder/decoder component 364, a code filter 366 that dissects the information in the application log 240 (FIG. 4), which could be accessed in memory 509 or local storage 510, such as in a secured stored logs data structure 368. An event handler component 370 can include logic for how to prioritize AppLog Manager 346 in the presence of event reports and log reports, such as delaying action on log reporting processing in order to handle higher priority events.

Computer platform 308 may further include a GPS engine 372 or other location sensing components provide location information of the communication device 300. The AppLog manager 346 can augment the log reporting with device monitoring information such as the location of the occurrence. The AppLog manager 346 can filter out user identifying information, for example, so that the value of log reporting does not violate the extent of privacy given to this communication, yet the location of such log reports can give context to the information. For example, a game application can correlate winning scores within a geographic region, constrain prize winners to locales where the game is legally permissible, or correlate usage to geographic regions in which certain advertising campaigns are underway, etc.

A communications module 374 that enables communications among the various components of communication device 300, as well as being operable to communications related to receiving enablement/disablement fault logging/reporting commands and reporting fault logs. Communications module 374 may be embodied in hardware, firmware, software and/or combinations thereof, and may further include all protocols for use in intra-device and inter-device communications. In one aspect, the communication module 374 includes a wireless broadband access technology portion 376, a wireless multicast technology portion 378, a cellular telephone radio technology portion 380, and a wireless personal access network portion 382. Examples of two-way wireless broadband access technology portion 376 can include one or more of a wireless code division multiple access (W-CDMA) component, an Evolution-Data Optimized (EV-DO) component, an IEEE 802.11 compliant (i.e., often mischaracterized by the trademark WiFi) component. An example of a wireless personal access network technology portion 376 includes a Bluetooth component. Examples of a wireless multicast technology portion 378 include a Forward Link Only (FLO) component and/or a Digital Video Broadcast-Handheld (DVB-H) component.

The communication module 374 can be accessed by a diagnostic monitoring and reporting component 384 that reports both events and log reports to a network 106, 108 (FIG. 2). In one aspect, the diagnostic monitoring and reporting component 384 can utilize MobileView™ suite, which is a suite of client applications that provide efficiencies in development, testing, operator certification and deployment. The optional server system allows remote access of mobile data. Triggering-events or continuous logging provide objective data for friendly-user trials and early deployments with Network Operators. MobileView can be customized to monitor Key Performance Indicators (KPIs), collecting critical pre- and post-event data for analysis and performance evaluation. Supported in QUALCOMM's Mobile Station Modem™ (MSM™) products, MobileView provides mobile diagnostic data around key events and remote capability without cable, offering a unique time-to-market advantage for handset manufacturers. Some of the benefits include improved testing efficiency by minimizing dependency on tethered logging, reduced drive-testing, as well as travel and equipment costs associated with handset debugging, associates GPS location information with handset KPIs to enhance efficiencies in field testing, client application logs mobile pre- and post-data around key events, minimizing field testing and time spent duplicating the problem, supported in all QUALCOMM MSMs, and can be implemented as a software solution.

In order to distribute computational overhead and/or to reduce transmission overhead on the communication system 100 (FIG. 2), an artificial intelligence (AI) component 386 and/or a rule-based logic component 388 can infer user behavior for reporting, make decisions as to when a reportable fault related event has occurred, and/or extrapolate location based on intermittent location sensing, etc, or to diagnose the cause of a failure.

The rules-based logic component 388 can be employed to automate certain functions described or suggested herein. In accordance with this alternate aspect, an implementation scheme (e.g., rule) can be applied to define types of attributes that should be acted upon or ignored, create rules that are aware of location sensing status, performance delays in certain components of the computing platform that would be deemed by the user to be a failure or poor performance, etc. By way of example, it will be appreciated that the rule-based implementation can automatically define criteria for severity of a fault.

The AI component 386 can facilitate automating performance of one or more features described herein such as learning what is normal and abnormal performance of a wireless mobile device, perhaps before and after a change in software installed or executed, extrapolating intermittent location data, adjusting user feedback provided to a user based on machine learning. Thus, employing various AI-based schemes can assist in carrying out various aspects thereof.

A classifier is a function that maps an input attribute vector, x=(x1, x2, x3, x4, xn), to a class label class(x). A classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the subject invention can employ classifiers that are pre-trained (e.g., via a generic training data from multiple users) as well as methods of reinforcement learning (e.g., via observing user behavior, observing trends, receiving extrinsic information). Thus, the subject invention can be used to automatically learn and perform a number of functions, including but not limited to determining, according to a predetermined criteria.

Figure 6:
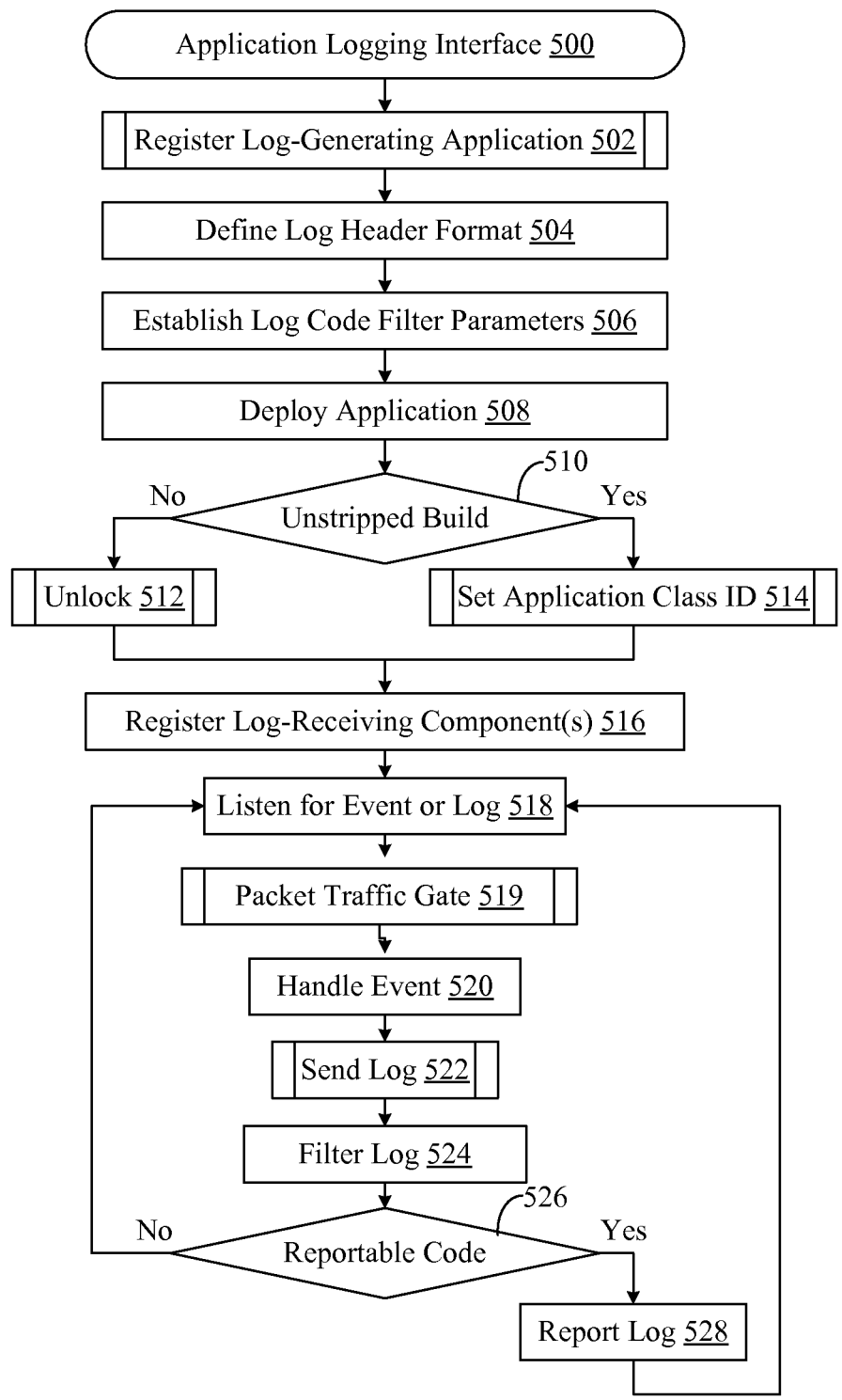
FIG. 6 is a flow diagram of a methodology for an application logging interface performed by the communication system of FIG. 1.

In FIGS. 6-10, a methodology 500 for application logging interface is depicted for allowing authenticated application to report log files for purposes such as troubleshooting, marketing feedback, etc. With particular reference to FIG. 6, a log-generating application 502 is registered in order to receive authenticating credentials. This registration can occur prior to deployment of the application to a wireless device so that the application includes the credentials. Alternatively, a downloaded or bundled application can be activated, or further enabled for log reporting, by a process after installation. Prior to sending log files, the application has a defined log header format in block 504 that the wireless device can interpret. In some instances, the wireless device also can interpret log code filter parameters in block 506 so that only log files of interest are stored and/or reported. With the application ready for logging, the application is deployed to one or more wireless devices in block 508.

In some aspects, a wireless device can be of a stripped configuration or an unstripped configuration, the latter containing additional functions suitable for use in a development and testing environment, for example, rather than a production environment. If a determination in block 510 determines that the wireless device is a stripped build, which is typically the case, then an unlock process 512 is performed. Otherwise, a Set Application Class ID process 514 is used to enable logging at the wireless device.

In block 516, one or more applications can be registered to receive logs for purposes such as wireless communicating. Another purpose can be to convert log data to a human legible form and to display the resultant text on a display of the wireless device, such as disclosed in U.S. patent application Ser. No. 11/175,606, entitled APPARATUS AND PROCESS FOR A UNIVERSAL DIAGNOSTIC MONITOR MODULE ON A WIRELESS DEVICE, Publication No. 2006/0234698 A1, assigned to the present assignee and hereby incorporated by reference.

Then, the wireless device listens for events or a log report to occur in block 518. In addition to, or as an alternative to authenticating an application for packet transport ("unlocking"), in block 519, a gating of transporting packets is performed to defensively prevent an accessory application for excessively utilizing the diagnostic reporting capabilities. For example, in order to more widely disseminate and to accommodate a wider array of accessory applications, some accessory applications can be configured to expect a greater bandwidth and/or data storage capability than a particular device is configured to provide. As another consideration, an accessory application could encounter a particular failure mode that results in an excessive torrent of data packets that can exhaust the data throughput and/or data storage capability of the device. As a further consideration, a particular device could be configured with a particular set of accessory applications that have to share the packet transport capability of the device.

In some situations, parties or entities external to the device could have a particular interest in receiving data packets from the accessory application, such as for troubleshooting or in proportion to a monetary inducement for such reporting, which could be accommodated by increasing the reporting thresholds for gating packet transport in block 519

In block 520, an event can be handled in a particular manner, such as delaying handling a log report that could be in nonvolatile storage or performing log report handling in a different manner as necessitated by the event (e.g., low battery power, power down, processor reset, hung processor, etc.).

Upon receipt of a log, a send log methodology is performed in block 522. In some instances, reporting of the log data is contingent upon certain filtering parameters, which are performed in block 524. If reportable code is determined in block 526, then the log is reported in block 528. Then processing returns to block 518.

Figure 7:
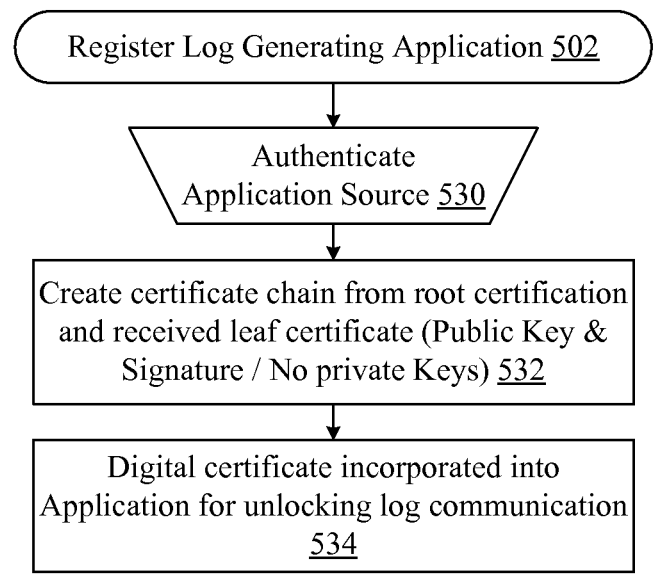
FIG. 7 is a flow diagram of a methodology for registering a log-generating application of the methodology of FIG. 6.

In FIG. 7, the methodology 502 for registering a log generating application includes a manual authentication of an application source in block 530. In block 532, a certificate chain from a root certificate is created and a leaf certificate provided. Then a digital certificate is incorporated into an application for unlocking log communication in block 534.

Figure 8:
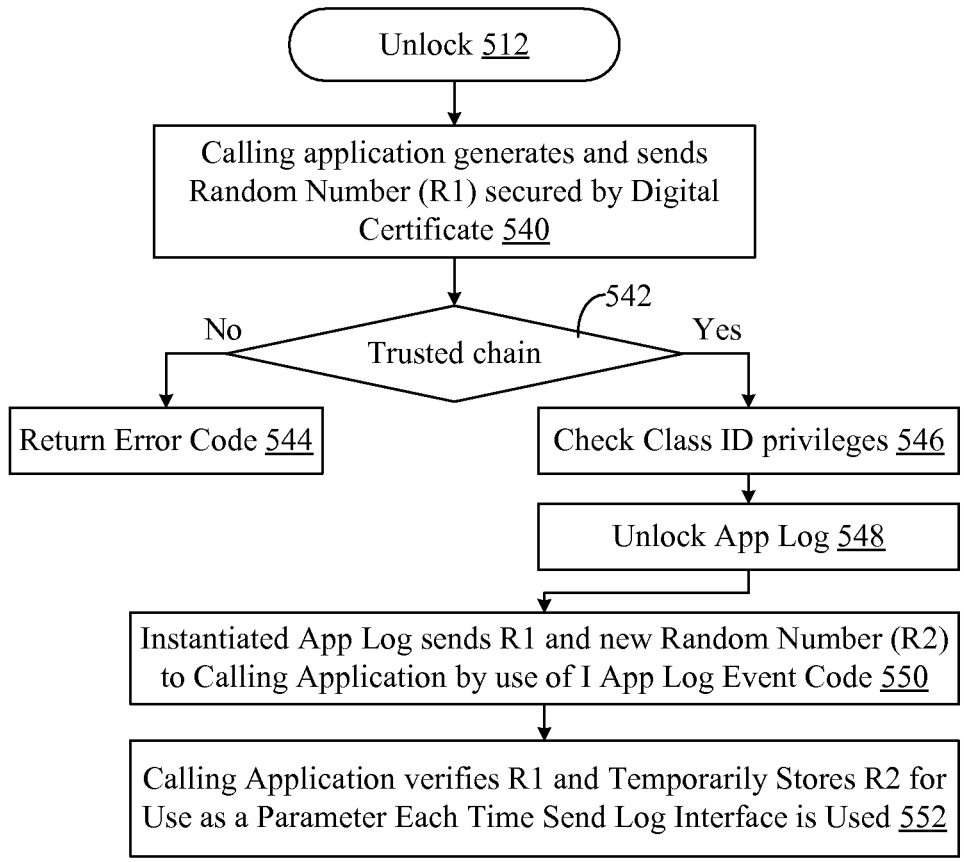
FIG. 8 is a flow diagram of a methodology for unlocking an application log interface of the methodology of FIG. 6.

In FIG. 8, the methodology 512 for unlocking logging for an application begins in block 540 with the calling application generating and sending a random number (R1) secured by the digital certificate. In block 542, a determination is made as to whether the request has a trusted chain, and if not returns an error code in block 544. If trusted, the class ID privileges held by the calling application are check in block 546 and then the Application Log (AppLog) is unlocked by instantiating App Log ("I App Log"). In block 550, the I App Log sends R1 and a new random number R2 encrypted back to the calling application. The calling application verifies the R1 and temporarily stores R2 for use as a parameter each time it sends a log request to the send log interface in block 552.

Figure 9:
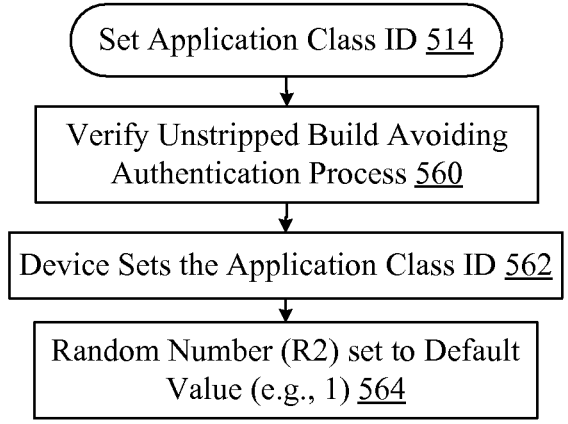
FIG. 9 is a flow diagram of a methodology for setting application class identification (ID) of the methodology of FIG. 6.

In FIG. 9, the methodology 514 for setting application class ID begins in block 560 by verifying that an unstrapped build is provided in the wireless device that enables avoiding authentication of the calling application. The wireless device is then able set the application class ID 562 so that the logging function is unlocked even though the calling application does not have the digital signature. The calling application is also given the random number R2, which is set to the default value 1, for each subsequent log report.

Figure 10:
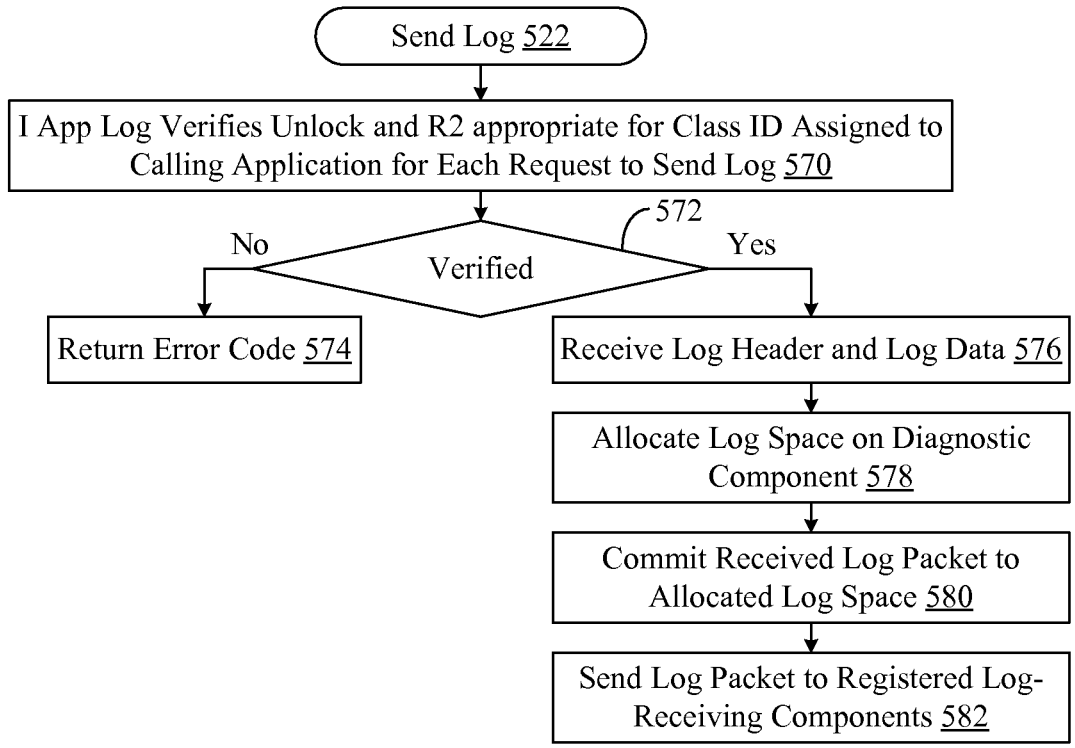
FIG. 10 is a flow diagram of a methodology sending a log of the methodology of FIG. 6.

In FIG. 10, the methodology 522 for send log begins in block 570 with the I App Log verifying that log reporting is unlocked, that the R2 is appropriate for the Class ID assigned to the calling application for this and subsequent requests to send log. If not verified in block 572, then an error code is returned in block 574. If verified, then the log header and log data is received in block 576. The log space is allocated on a diagnostic component in block 578. The allocated space is committed to receive the log packet in block 580. Then in block 582, the log packet is sent to registered log-receiving components, such as by sending memory pointers and log size parameters.

Figure 11:
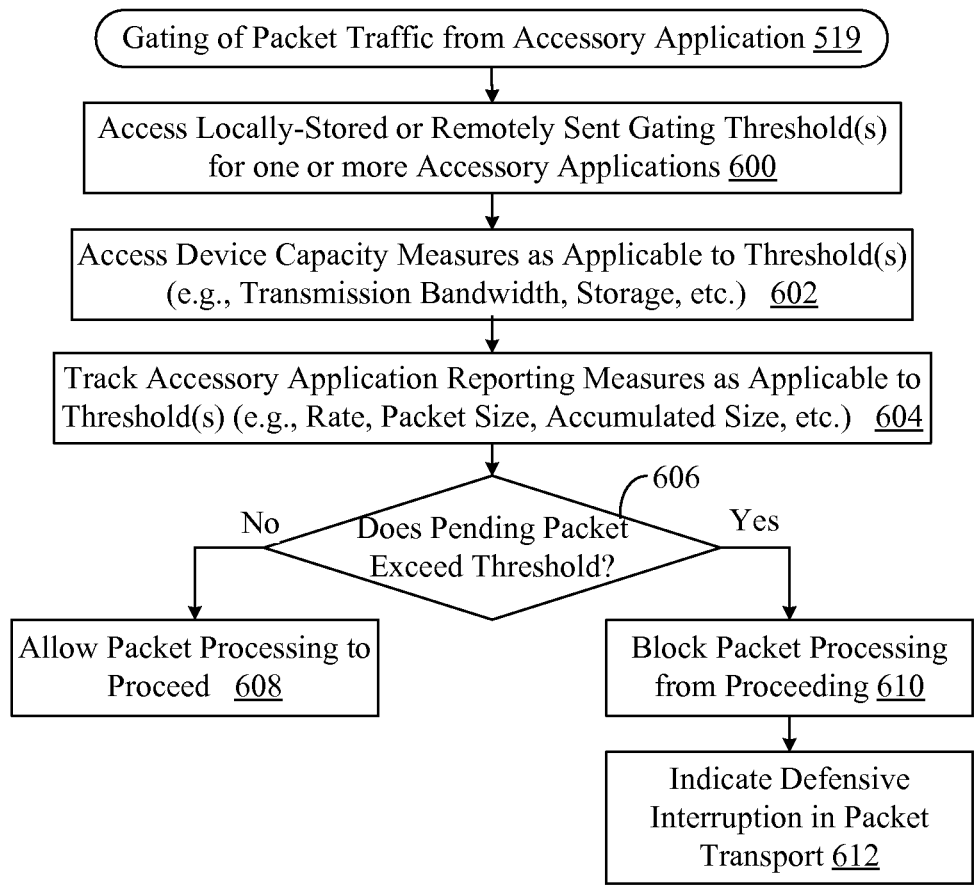
FIG. 11 is a flow diagram of a methodology for gating transport of packets of the methodology of FIG. 6 as an additional or alternative transport defense to the authenticating methodology of FIG. 8.

In FIG. 11, the methodology 519 for gating transport of data packets from the accessory application of FIG. 6 can enhance defense of trusted component use of a data channel (e.g., diagnostic reporting). In block 600, gating threshold(s) are accessed, either locally stored on a mobile device or dynamically set remotely. In an illustrative implementation, the thresholds are related to a size of a buffer available for storing such packets. For one variant, consider an allocated buffer of 4 KB (4096 bytes) with an allotted size of each application log packet being 500 bytes, which thus equates to a limit of 8 packets. For implementations able to clear this 4 KB buffer each second (e.g., transmit to a remote destination or store to a local nonvolatile storage medium, this capacity dictates an upper threshold, perhaps lowered by other considerations such a plurality of unlocked accessory applications using this buffer. Thus, in one illustrative aspect, a limit range could be, but is not limited to, between 1 packets/seconds to 16 packets/seconds, depending upon the buffer size and processing capability of the device. Such a threshold could be statically predetermined or dynamically set, such as by a third party that allocates a certain proportion for use by the accessory application in exchange for monetary renumeration or to generate sufficient diagnostic information for troubleshooting.

In block 602, device capacity measures that affect the threshold are accessed. For example, the threshold could be driven by available buffer space, which could be dynamically affected by other components not directly measured by this gating feature. As another example, the transmission bandwidth could dynamically change, such as interference levels or receiver capacity for destinations that include a wireless transmission link. Thus, the utilization afforded to the accessory application could change.

In block 604, the accessory application reporting are tracked in order to arrive at measure suitable for comparison to the defined thresholds, such as rate of packets, size of each packet, accumulated size of data packets prepared for transport, etc. Then a determination is made in block 606 as to whether the tracked measure exceeds the threshold. If not, packet processing is allowed to proceed in block 608. If exceeded in block 606, then block processing is blocked from proceeding in Block 610. In some implementations, it can be desirable to indicate that defensive interruption of packet transport 612 has occurred, such as flagging the data as incomplete, so that those analyzing the data will be aware that the accessory application requested additional reporting capacity. Such indication of incompleteness can warrant a change in the threshold or indicate that a problem with the accessory application is greater than the transported information packets would otherwise indicate.

The various illustrative logics, logical blocks, modules, and circuits described in connection with the versions disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A wireless device for selectively transporting an information packet generated by an accessory application residing therein to a log file destination, comprising:
   a log send component;
   a transport defensive module for determining that the information packet associated with the accessory application of the wireless device does not violate a defensive constraint of a trusted component, authenticating the accessory application, and unlocking the log send component for use by the accessory application;
   an accessory application packet interface for packaging the information packet, using the log send component, with a trusted credential of the trusted component in response to the determination; and
   a diagnostic component for transferring through trusted components the packaged information packet including the information packet generated by the accessory application which is not trusted by the trusted components and the trusted credential to the log file destination so as to provide a secure manner of further transfer therefrom to a source external to the wireless device and without compromising the integrity and functionality of the trusted component.

2. The wireless device of claim 1, further comprising an application interface for gating transport of the information packet by authenticating a chain of title of the accessory application executing on the wireless device prior to unlocking access to the diagnostic component.

3. The wireless device of claim 2, further comprising a storage medium containing a data structure containing a privilege code assigned to the accessory application, wherein the application interface authenticates the chain of title of the accessory application by recognizing a digital certificate used by the accessory application and a privilege code associated with the digital certificate.

4. The wireless device of claim 3, wherein the application interface receives a first value encrypted with the digital certificate from the accessory application and responds with a digitally signed first value and a second value so that the accessory application can verify a transferor of the information packet and can send subsequent requests with the second value without encryption overhead.

5. The wireless device of claim 2, further comprising a set application class identifier component for selectively providing an authentication override feature for facilitating use of a trusted application on the wireless device.

6. The wireless device of claim 1, further comprising a data storage containing a data structure holding a log header and log data of the information packet produced by the accessory application, wherein the application interface recognizes a size code used by the interface to access the information packet of binary data of variable length.

7. The wireless device of claim 1, further comprising a stored data structure containing a class identifier of the accessory application indicating a privilege to communicate, wherein the accessory application packet interface registers the device monitoring component to listen for the class identifier and to wirelessly report the information packet.

8. The wireless device of claim 1, further comprising:
a stored data structure containing at least one binary code used by the accessory application; and
a filtering component to cause reporting of the information packet by the device monitoring component in response to detecting the at least one binary code in the information packet.

9. The wireless device of claim 1, wherein the application interference gates transport of the information packet by comparing a measure associated with the information packet against a threshold related to transport capacity.

10. A method of selectively transporting an information packet generated by an accessory application residing in a wireless device to a log file destination, comprising:
determining that the information packet associated with the accessory application of the wireless device does not violate a defensive constraint of a trusted component;
authenticating the accessory application;
unlocking a log send component for use by the accessory application;
packaging the information packet, using the log send component, with a trusted credential of the trusted component in response to the determination; and
transferring through trusted components the packaged information packet including the information packet generated by the accessory application which is not trusted by the trusted components and the trusted credential to the log file destination so as to provide a secure manner of further transfer therefrom to a source external to the wireless device and without compromising the integrity and functionality of the trusted component.

11. The method of claim 10, further comprising gating transport of the information packet from the accessory application in response to the determination by comparing a measure associated with the information packet against a threshold related to transport capacity.

12. The method of claim 10, further comprising storing the packaged information packet on the wireless device in a computer program product.

13. The method of claim 10, further comprising wirelessly transmitting the packaged information packet to a network.

14. The method of claim 10, further comprising gating transport of the information packet from the accessory application by authenticating a chain of title of the accessory application executing on the wireless device prior to unlocking an interface to a diagnostic component.

15. The method of claim 14, further comprising:
authenticating a source for the accessory application;
providing a digital certificate to the source for inclusion with a third-party application;
storing on the wireless device a privilege assigned to the accessory application; and
authenticating the chain of title of the accessory application by recognizing the digital certificate and the communication privilege associated with the digital certificate.

16. The method of claim 15, further comprising:
receiving a first value encrypted with a digital key associated to the digital certificate from the accessory application; and
digitally signing and responding with the digitally signed first value so that the accessory application verifies a transferor of the information packet.

17. The method of claim 16, further comprising responding with the first value and a second value digitally signed so that the accessory application verifies the transferor of the information packet and sends subsequent requests with the second value without encryption overhead.

18. The method of claim 10, further comprising defining a header for the information packet used by the accessory application, the header containing a code used by the trusted component to access the information packet.

19. The method of claim 18, further comprising accessing an information packet size code for determining an end of a stored information packet.

20. The method of claim 18, further comprising accessing a uniquely assigned application class identifier for identifying the communication privilege of the accessory application.

21. The method of claim 10, further comprising selectively providing an authentication override feature for facilitating use of a trusted application on the wireless device.

22. The method of claim 21, further comprising selectively providing the authentication override feature by allowing a device to set a class identifier and first value for the accessory application.

23. The method of claim 10, further comprising:
storing on the trusted component of the wireless device a reporting code received from a source of the accessory application; and
transferring the packaged information packet in response to detecting the reporting code in the information packet.

24. The method of claim 10, further comprising detecting a binary reporting code by byte-by-byte comparison of a binary information packet.

25. The method of claim 10, further comprising:
assigning a log identifier to the accessory application; and
receiving the log identifier in a header of the information packet.

26. The method of claim 25, further comprising registering the log file destination to listen for the packaged information packet from the trusted component.

27. A non-transitory computer-readable medium including processor-executable instructions thereon for performing a method to selectively transport an information packet generated by an accessory application residing in a wireless device to a log file destination, the method comprising the steps to:
determine that the information packet associated with the accessory application of the wireless device does not violate a defensive constraint of a trusted component;
authenticate the accessory application;
unlock a log send component for use by the accessory application;
package the information packet, using the log send component, with a trusted credential of the trusted component in response to the determination; and
transfer through trusted components the packaged information packet including the information packet generated by the accessory application which is not trusted by the trusted components and the trusted credential to the log file destination so as to provide a secure manner of further transfer therefrom to a source external to the wireless device and without compromising the integrity and functionality of the trusted component.

28. An apparatus for selectively transporting an information packet generated by an accessory application residing in a wireless device to a log file destination, comprising:

means for sending a log component;

means for determining that the information packet associated with the accessory application of the wireless device does not violate a defensive constraint of a trusted component, authenticating the accessory application, and unlocking the means for sending a log component for use by the accessory application;

means for packaging the information packet, using the means for sending a log component, with a trusted credential of the trusted component in response to the determination; and means for transferring through trusted components the packaged information packet including the information packet generated by the accessory application which is not trusted by the trusted components and the trusted credential to the log file destination so as to provide a secure manner of further transfer therefrom to a source external to the wireless device and without compromising the integrity and functionality of the trusted component.

* * * * *